F. X. EWALD.
PNEUMATIC CONTROL APPARATUS FOR MOTOR VEHICLES.
APPLICATION FILED APR. 10, 1917.

1,315,104.

Patented Sept. 2, 1919.

WITNESSES

INVENTOR
F. X. Ewald
BY Victor J. Evans
ATTORNEY

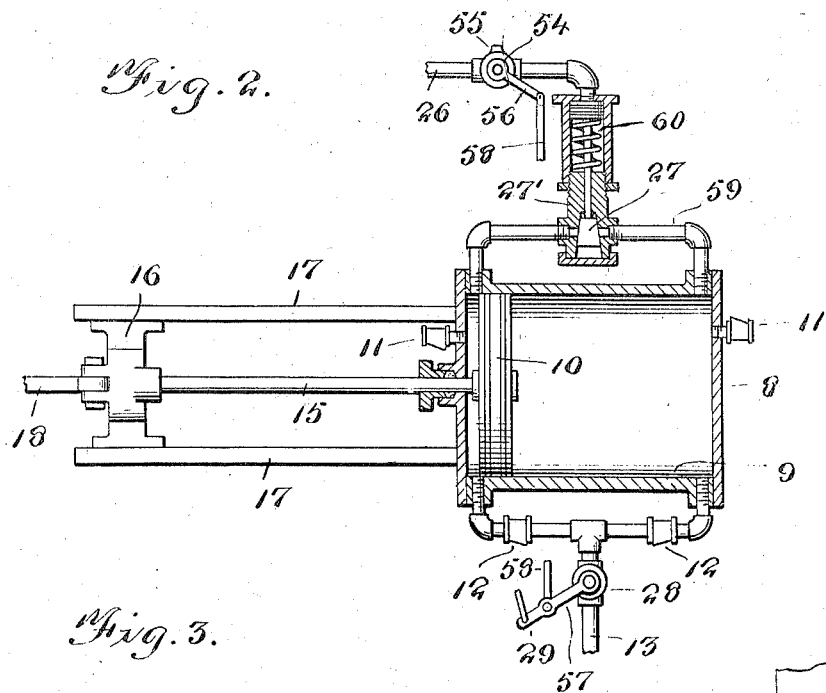
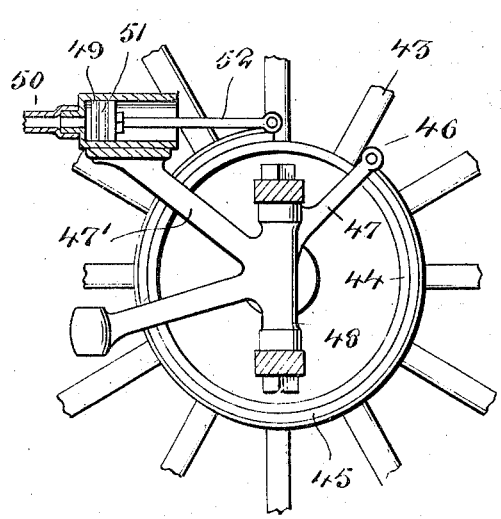
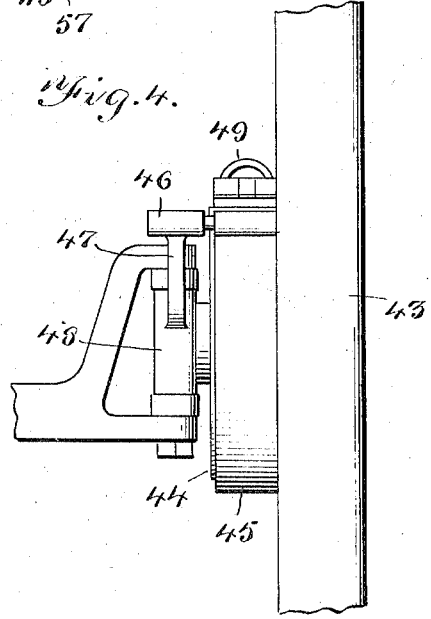

UNITED STATES PATENT OFFICE.

FRANK X. EWALD, OF LA SALLE, ILLINOIS.

PNEUMATIC CONTROL APPARATUS FOR MOTOR-VEHICLES.

1,315,104.   Specification of Letters Patent.   Patented Sept. 2, 1919.

Application filed April 10, 1917. Serial No. 161,048.

*To all whom it may concern:*

Be it known that I, FRANK X. EWALD, a native citizen of the United States, residing at La Salle, in the county of La Salle and State of Illinois, have invented new and useful Improvements in Pneumatic Control Apparatus for Motor-Vehicles, of which the following is a specification.

This invention relates to pneumatic control apparatus for motor vehicles, the object in view being to provide in connection with the motor vehicle, air compressing means actuated by a rotary element of the driving mechanism of the vehicle, a compressed air storage tank which receives the air under pressure from the compressor, and novel means for utilizing the compressed air thus stored for applying a plurality of brakes, one of which involves the use of an air cushion, the compressed air also being utilized for the purpose of starting the engine operating a signal and inflating the tires.

The chief object of the invention is to provide mechanism of efficient and reliable construction and operation, enabling the brakes to be applied gradually or suddenly according to requirements.

With the above and other objects in view, the invention consists in the novel construction, combination and arrangement of parts, herein described, illustrated and claimed.

In the accompanying drawings:—

Figure 1 is a plan view illustrating diagrammatically the apparatus of this invention in the applied relation thereof to a motor vehicle.

Fig. 2 is an enlarged detail sectional view of the air compressor.

Fig. 3 is a side elevation of one of the front wheel brakes, partly in section.

Fig. 4 is a fragmentary elevation taken at a right angle to Fig. 3.

Referring to the drawings 1 designates the rear driving axle of a motor vehicle, 2 the main driving or transmission shaft, 3 a universal joint therein, 4 the housing in which the changeable speed transmission gearing is contained, 5 the engine, 6 the engine shaft and 7 the main clutch which connects the transmission shaft 2 with the engine shaft 6, all of the parts hereinabove referred to being of the usual construction and arrangement.

In carrying out the present invention, an air compressor 8 is located in any convenient position and supported by the machine frame, said compressor embodying a cylinder 9, a reciprocatory piston 10 working therein, air inlet valves 11 and air outlet valves 12. A pipe 13 extends from the outlet of the air compressor to a storage tank 14 into which the air is forced from the compressor. The piston 10 is mounted upon one end of a piston rod 15 which passes through a stuffing box in the head of the cylinder 9 and is connected to a sliding cross head 16 working between suitable guides 17. A pitman 18 connects the sliding cross head 16 to the wrist pin 19 of a crank disk 20 fast on a shaft 21 which is adapted to be connected by means of a clutch 22 controlled from the driver's seat, to a shaft 23 actuated by a gear 24 meshing with and driven by a gear 25 fast on the shaft 2 hereinabove referred to. By means of the clutch 22, the air compressor 8 may be thrown into and out of operation. The gears 24 and 25 may be of any type.

A pipe 26 is connected at one end to the storage tank 14 and at its other end to the air compressor 8 and said pipe 26 has incorporated therein a pressure relief or safety valve 27 adapted when a certain predetermined pressure is obtained in the tank 14 and in the air compressor 8, to automatically open, thereby preventing excessive pressure in the compressor and tank. A valve 28 is incorporated in the pipe 13 in order that the communication may be cut off between the air compressor and the compressed air storage tank. This valve 28 is provided with operating means 29 adapting it to be controlled from the operator's seat who may partially or wholly open and close said valve. When the valve is closed, the air trapped in the cylinder 9 of the air compressor forms a cushion which progressively resists the movement of the piston 10 and adapts it to be utilized as a brake in that it resists or stops the rotation of the shaft 2 and consequently the rear driving axle and wheels. The brake just described may by means of the valve 28 be applied suddenly or gradually as may be found expedient or necessary.

A compressed air motor 30 supported by the machine frame in any suitable manner is connected by a compressed air supply pipe 31 to the tank 14 and is controlled by a valve 32 by means of which compressed air may be delivered to the motor 30 or cut off therefrom. The shaft of the motor 30 adapted to be connected by means of a clutch 34 to a gear 36 on said shaft, the gear 36 meshing with and actuating a gear 37 on the engine shaft 6. The motor 30 is thus utilized for turning over the engine shaft 36 and starting the engine.

An audible alarm or signal 38 is connected with the tank 14 by means of a pipe 39 for the compressed air, said pipe containing a valve 40 adapted to be operated by suitable connections from the driver's seat. A tire inflating flexible tube 41 is connected to the tank 14 and controlled by a valve 42, enabling the tires of the vehicle to be inflated with the compressed air taken from the tank 14.

The brake mechanism for each of the front wheels 43 comprises a drum 44 fastened to the inner side of said wheel. Encircling said drum is a brake brand 45 one end of which is secured to a fixed point 46 on a supporting arm 47 extending from the adjacent steering knuckle 48 which carries the spindle for the wheel 43. Mounted upon a supporting arm 47' is a cylinder 49 from which a flexible pipe 50 leads to the compressed air storage tank 14. Working in the cylinder 49 is a piston 51 the rod 52 of which is connected to the free end of the brake band 45. A stop cock 53 is interposed between the cylinder 49 and the tank 14 so that compressed air may be delivered to the cylinder 49 to actuate the piston 51 and apply the brake band 45, the latter being held normally out of engagement with the drum 44 by any usual or preferred means. It will be understood that both of the front wheels may be equipped with either single or double internal or external brakes or both.

The pipe 26 is controlled by a valve 54 the casing of which has a vent 55. The arms 56 and 57 of the valves 54 and 28 are coupled together by a connecting rod 58 so that both of said valves may be simultaneously closed when braking. The casing 27' of the valve 27 is in communication with a by-pass 59 which communicates with the ends of the cylinder 9, the valve 27 being held seated with a predetermined pressure by a spring 60. When the valve 27 is open, air in the cylinder 9 may move freely back and forth through the by-pass offering no resistance to the piston 10.

From the foregoing description taken in connection with the accompanying drawings it will now be seen that the pneumatic control apparatus provides for compressing air and delivering the same to a storage tank from which it may be taken and utilized for the several purposes hereinabove set forth. By partially or wholly closing the valve 28, the piston 10 may be gradually or suddenly checked and cushioned, in turn resisting the rotation of the shaft 2 and the driving axle and driving wheels of the vehicle. By operating the valve 53, the brakes may be applied to the front wheels of the vehicle and by operating the valve 32, the starting motor may be thrown into operation. By means of the valve 40, the audible signal 38 may be sounded and by means of the flexible pipe 41 and valve 42, the tires may be readily inflated. The air may also be used to blow dirt, dust and the like from the car and clean out clogging matter from pipes, passages, screens, etc. When the pressure in the compressed air tank reaches a predetermined point, the relief valve 27 opens, and relieves any excessive pressure in the storage tank 14. The operator then, by means of the clutch 22, may throw the air compressor out of operation.

The air brake hereinabove described is safe and reliable and all the working parts thereof are inclosed in a dust proof and oil-tight housing thus preventing the development of squeaking and other noises and preventing the working parts from becoming dry. In addition to the air brake, the front wheel brakes are also operated by air rendering them more powerful and also insuring the proper application of both brakes as the air pressure is equally delivered thereto.

I claim:—

1. The combination with the driving shaft of a motor vehicle, of an air compressor embodying a cylinder having inlet and outlet valves, a piston working in said cylinder and geared to and actuated by said driving shaft, clutch means for throwing said air compressor into and out of operation, a compressed air storage tank in communication with the outlet of said air compressor, a manually controlled valve between the air compressor and storage tank, adapted when closed to cut off communication between said compressor and tank and trap the air in said compressor to form an air cushion for braking purposes, a pipe connecting the air compressor with said storage tank, and a pressure relief valve in said pipe adapted to open automatically when a predetermined pressure exists in the tank.

2. The combination with the driving shaft of a motor vehicle, of an air compressor embodying a cylinder having inlet and outlet valves, a piston working in said cylinder and geared to and actuated by said driving shaft, clutch means for throwing said air compressor into and out of operation, a compressed air storage tank in communication with the outlet of said air compressor, a manually controlled valve between the air compressor and storage tank, adapted when closed to cut off communication between said compressor and tank and trap the air in said compressor to form an air cushion for braking purposes, a pipe connecting the air compressor with said storage tank, a pressure relief valve in said pipe adapted to open automatically when a predetermined pressure exists in the tank, front wheel brake mechanism supported by the steering knuckles of the front wheels and embodying drums on said wheels, brake bands encircling said drums, cylinders and pistons for contracting said brake bands, and valve controlled flexible connections between the last named cylinders and said compressed air storage tank.

3. The combination with the driving shaft of a motor vehicle, of an air compressor embodying a cylinder having inlet and outlet valves, a piston working in said cylinder and geared to and actuated by said driving shaft, clutch means for throwing said air compressor into and out of operation, a compressed air storage tank in communication with the outlet of said air compressor, a manually controlled valve between the air compressor and storage tank, adapted when closed to cut off communication between said compressor and tank and trap the air in said compressor to form an air cushion for braking purposes, a pipe connecting the air compressor with said storage tank, a pressure relief valve in said pipe adapted to open automatically when a predetermined pressure exists in the tank, an air motor in communication with said storage tank and geared to the engine shaft, and clutch means for throwing said air motor into and out of operation.

In testimony whereof I affix my signature.

FRANK X. EWALD.